(12) United States Patent
Pekny

(10) Patent No.: US 11,263,154 B2
(45) Date of Patent: Mar. 1, 2022

(54) BLOCK OR PAGE LOCK FEATURES IN SERIAL INTERFACE MEMORY

(71) Applicant: Micron Technology, Inc., Boise, ID (US)

(72) Inventor: Theodore T. Pekny, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/383,260

(22) Filed: Dec. 19, 2016

(65) Prior Publication Data

US 2017/0097901 A1    Apr. 6, 2017

Related U.S. Application Data

(60) Continuation of application No. 14/203,340, filed on Mar. 10, 2014, now Pat. No. 9,524,250, which is a continuation of application No. 13/342,826, filed on Jan. 3, 2012, now Pat. No. 8,671,242, which is a division of application No. 11/873,805, filed on Oct. 17, 2007, now Pat. No. 8,090,955.

(51) Int. Cl.
| | |
|---|---|
| *G06F 12/14* | (2006.01) |
| *G06F 13/40* | (2006.01) |
| *G06F 21/44* | (2013.01) |
| *G06F 21/57* | (2013.01) |
| *G06F 21/60* | (2013.01) |
| *G06F 13/16* | (2006.01) |
| *G06F 13/42* | (2006.01) |
| *G06F 12/02* | (2006.01) |
| *G06F 21/81* | (2013.01) |

(52) U.S. Cl.
CPC ...... *G06F 12/1458* (2013.01); *G06F 12/0246* (2013.01); *G06F 12/14* (2013.01); *G06F 12/1425* (2013.01); *G06F 13/1668* (2013.01); *G06F 13/4068* (2013.01); *G06F 13/4282* (2013.01); *G06F 21/44* (2013.01); *G06F 21/575* (2013.01); *G06F 21/604* (2013.01); *G06F 21/81* (2013.01); *G06F 2212/1052* (2013.01); *G06F 2221/2101* (2013.01); *G06F 2221/2117* (2013.01); *G06F 2221/2147* (2013.01)

(58) Field of Classification Search
None
See application file for complete search history.

(56) References Cited

U.S. PATENT DOCUMENTS

| | | |
|---|---|---|
| 4,758,718 A | 7/1988 | Fujisaki et al. |
| 5,375,243 A | 12/1994 | Parzych et al. |
| | (Continued) | |

OTHER PUBLICATIONS

Axelson, "USB Mass Storage: Designing and Programming Devices and Embedded Hosts," 2006, 32 pps, Lakeview Research LLC.

(Continued)

*Primary Examiner* — Kaushikkumar M Patel
(74) *Attorney, Agent, or Firm* — Fletcher Yoder, P.C.

(57) ABSTRACT

Embodiments are provided for protecting boot block space in a memory device. Such a memory device may include a memory array having a protected portion and a serial interface controller. The memory device may have a register that enables or disables access to the portion when data indicating whether to enable or disable access to the portion is written into the register via a serial data in (SI) input.

23 Claims, 4 Drawing Sheets

(56) References Cited

U.S. PATENT DOCUMENTS

| | | | |
|---|---|---|---|
| 5,509,134 | A | 4/1996 | Fandrich et al. |
| 5,537,544 | A | 7/1996 | Morisawa et al. |
| 5,592,641 | A | 1/1997 | Fandrich et al. |
| 5,991,197 | A | 11/1999 | Ogura et al. |
| 6,026,016 | A | 2/2000 | Gafken |
| 6,098,077 | A | 8/2000 | Sassa |
| 6,154,819 | A | 11/2000 | Larsen et al. |
| 6,647,498 | B1 | 11/2003 | Cho |
| 6,731,536 | B1 | 5/2004 | McClain et al. |
| 6,772,307 | B1 | 8/2004 | Nguyen et al. |
| 6,970,381 | B2 * | 11/2005 | Nakata .................. G11C 16/22 365/185.04 |
| 7,062,623 | B2 | 6/2006 | Vogt et al. |
| 7,376,010 | B2 | 5/2008 | Tanaka et al. |
| 7,389,103 | B2 | 6/2008 | Stepanian |
| 7,457,908 | B2 | 11/2008 | Perroni et al. |
| 8,102,710 | B2 | 1/2012 | Pekny et al. |
| 8,103,936 | B2 | 1/2012 | Pekny et al. |
| 8,375,189 | B2 | 2/2013 | Qawami et al. |
| 8,429,329 | B2 | 4/2013 | Pekny et al. |
| 2002/0166061 | A1 | 11/2002 | Falik et al. |
| 2003/0147285 | A1 | 8/2003 | Ausserlechner |
| 2004/0057320 | A1 | 3/2004 | Roohparvar et al. |
| 2004/0215908 | A1 | 10/2004 | Zimmer et al. |
| 2005/0071592 | A1 | 3/2005 | DeCaro |
| 2005/0138399 | A1 | 6/2005 | Cheston et al. |
| 2005/0273548 | A1 | 12/2005 | Roohparvar |
| 2006/0020819 | A1 | 1/2006 | Yamazaki |
| 2006/0041756 | A1 | 2/2006 | Ashok et al. |
| 2006/0236204 | A1 | 10/2006 | Lee et al. |
| 2006/0242425 | A1 | 10/2006 | Ishida |
| 2006/0248267 | A1 | 11/2006 | Xie |
| 2007/0016741 | A1 | 1/2007 | DeCaro |
| 2007/0115743 | A1 | 5/2007 | Sartori et al. |
| 2009/0064318 | A1 | 3/2009 | Guo |

OTHER PUBLICATIONS

Micron Technology, Inc., Technical Note,TN-28-01, Boot Block Flash Memory Technology, FT01 p. 65, Rev. Dec. 1999, pp. 1-4.

Micron Technology, Inc., Technical Note, TN-28-02, Bulk Erase to Boot Block Conversion, FT02 p. 65, Rev. Dec. 1999, pp. 1-3.

Micron Technology, Inc., Flash Memory, 8Mb Smart 3 Boot Block Flash Memory, MT28F008B3, MT28F800B3, #V Only, Dual Supply (Smart 3), Q10.fm, Rev. E Jun. 2004 EN, pp. 1-30.

Micron Technology, Inc., Technical Note, NAND Flash Security, TN-29-11: NAND Flash Security Overview, tn2911_nand_security. fm—Rev. B May 2007 EN, pp. 1-10.

Texas Instruments, TMS 320x28xx, 28xxx DSP Serial Peripheral Interface (SPI) Reference Guide, Literature No. SPRU059D, June 2002—Revised Nov. 2006, pp. 1-60.

Micron Technology, Inc., 4Gb, 8Gb, and 16Gb+8 NAND Flash Memory Features, NAND Flash Memory, MT29F4G08AAA, MT29F8G08BAA, MT29F8G08DAA, MT29F16G08FAA, 4gb_nand_m4oa_1.fm—Rev. B, Feb. 2007 EN, 2006, pp. 1-81.

Micron Technology, Inc. et al., ONFi Open NAND Flash Interface, "Open NAND Flash Interface Specification", Revision 1.0, Dec. 28, 2006, pp. 1-106.

* cited by examiner

BLOCK OR PAGE LOCK FEATURES IN SERIAL INTERFACE MEMORY

CROSS-REFERENCE TO RELATED APPLICATIONS

The present application is a continuation application of U.S. application Ser. No. 14/203,340, entitled "Block or Page Lock Features in Serial Interface Memory," filed Mar. 10, 2014, now U.S. Pat. No. 9,524,250 which issued on Dec. 20, 2016, which is a continuation of U.S. application Ser. No. 13/342,826, entitled "Boot Block Features in Synchronous Serial Interface NAND," filed Jan. 3, 2012, now U.S. Pat. No. 8,671,242 which issued on Mar. 11, 2014, which is a divisional application of U.S. application Ser. No. 11/873, 805, entitled "Boot Block Features in Synchronous Serial Interface NAND," filed Oct. 17, 2007, now U.S. Pat. No. 8,090,955 which issued on Jan. 3, 2012, the entirety of which is incorporated by reference herein for all purposes.

BACKGROUND

1. Field of the Invention

Embodiments of the present invention relate generally to protecting boot block space in memory devices.

2. Description of the Related Art

A serial peripheral interface (SPI) is a communication interface that provides a synchronous serial data link between a master device and a slave device. SPI provides support for a low to medium bandwidth network connection amongst processors and other devices.

The SPI bus includes four wires including of two control lines and two data lines. The control lines include a Serial Clock (SCK) line and a Chip Select (CS) line. The SCK signal is used to clock the shifting of serial data simultaneously into and out of the master and slave devices, allowing the SPI architecture to operate as a full duplex protocol. The CS line is driven with a signal that enables or disables the slave device being controlled by the master device. Furthermore, the master device may communicate with additional slave devices, although an additional CS line is required for each additional slave device.

SPI data lines include a Serial Data Out (SO) line and a Serial Data In (SI) line. The SO line is a data communication line that transfers data from an output of the slave device to an input of the master device. Similarly, the SI line is a data communication line that transfers data from the output of the master device to the input of the slave device. The SO and SI lines are active when the CS signal for a specific slave device transitions to an enabling state, typically active low.

Because SPI utilizes only four lines of communication, SPI has become increasingly advantageous for use in systems that require relatively simple IC designs. For example, devices which have been configured to communicate using SPI include several types of nonvolatile memory devices, including EEPROM and NOR flash memory. The SPI's relatively simple configuration of control and data lines allows for a relatively high board density at a low cost. For example, SPI EEPROM devices allow for ICs with as few as 8 pins, whereas conventional EEPROM devices may require 32 or more pins. Similarly, SPI NOR flash memory also allows ICs with substantially fewer pins than conventional NOR memory devices. Accordingly, SPI may be advantageous for use in applications desiring compact and simple layouts, such as computers.

Computer systems and other electrical systems generally include one or more memory devices. For example, computers often employ NOR flash memory and NAND flash memory. NOR and NAND flash each have certain advantages over the other. For example, NOR flash memory typically has slower write and erase speeds than NAND flash. Further, NAND flash memory typically has more endurance than NOR flash memory. However, NOR flash memory typically enables random access to data stored within the memory devices, whereas, NAND flash memory generally operates by accessing and writing data in larger groups. For example, NAND flash memory typically includes a plurality of blocks. Each block includes a plurality of pages that each includes a large number of bytes of data. During NAND flash memory operation, data is erased one block at a time and written one page at a time.

Memory arrays are generally divided into several blocks, each block including a plurality of pages of data. The memory array may also include one or more boot blocks. Boot blocks are typically smaller in size compared to the main data blocks and are used to store sensitive data, for example, boot code. Although some memory devices may include only a single boot block, as computing technology has advanced, boot code for computing devices has also increased in size, thus driving the need for increased boot block space. Because of the often sensitive nature of the data stored in the boot blocks, there is a need for security mechanisms to limit access to boot block data.

Embodiments of the present invention may be directed to one or more of the problems set forth above.

DETAILED DESCRIPTION

Figure 1:
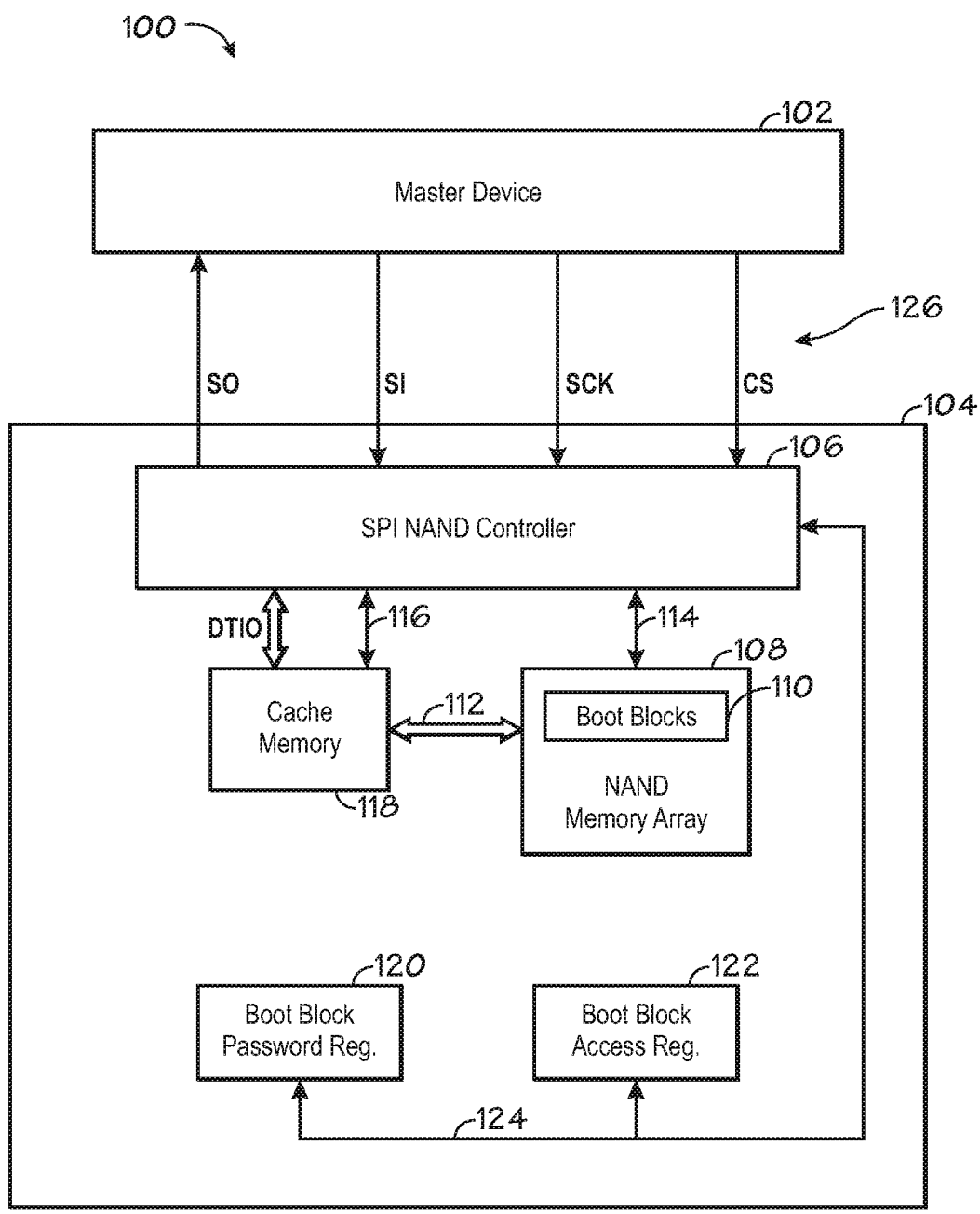
FIG. 1 is a block diagram of a NAND memory system in accordance with one or more embodiments of the present invention.

Turning now to the drawings, and referring initially to FIG. 1, a block diagram depicting a NAND memory system, in accordance with one or more embodiments of the invention, is illustrated, and designated generally by reference numeral 100. The memory system 100 may be adapted for use in a variety of applications, such as, a computer, pager, cellular phone, digital camera, digital audio player, control circuit, etc. The system 100 may include a master device 102 and a slave device 104. In one embodiment, the master device 102 may include programmed control circuitry, such as a microcontroller, and the slave device 104 may include a NAND memory device, as illustrated in FIG. 1. Further, while additional slave devices may be interfaced with and controlled by the master device 102, for purposes of simplicity, only one slave device 104 is illustrated in FIG. 1.

The master device 102 typically communicates with the slave device 104 via one or more transmission lines. As illustrated in FIG. 1, the master device 102 and the slave device 104 communicate via a serial peripheral interface (SPI) including an SPI bus 126. SPI provides a synchronous serial data link and operates in full duplex mode. During operation, devices on the SPI bus 126 typically operate in master/slave mode, enabling the master device 102 to initiate data frames to the slave device 104. The master device 102 and the slave device 104 may also include various shift registers configured to exchange and store data.

The SPI bus 126 provides four lines of communication, including two data lines and two control lines. The data lines of the SPI bus 126 include a Serial Data In (SI) line and a Serial Data Out (SO) line. The SI line is a data communication line that carries data from the output of the master device 102 to the input of the slave device 104. Similarly, the SO line is a data communication line carrying data from the output of the slave device 104 to the input of the master device 102.

The control lines include a serial clock (SCK) line and a chip select (CS) line. The SCK line provides a clock signal from the master device 102 to the slave device 104. The SCK signal is typically driven with a digital clock signal to regulate the flow of bits between the devices. For example, data may be latched or written on either a rising edge or falling edge of the SCK signal. The CS line is driven with a signal that enables or disables the slave device 104 being controlled by the master device 102. Typically, the CS line is active low. For example, the master device 102 may drive the CS line low in order to enable and communicate with the slave device 104. As discussed above, certain embodiments of the memory system 100 may include multiple slave devices 104. By way of example, each additional slave device may be connected to the master device 102 by one of a plurality of CS lines, while a single SCK, SI, and SO line may be shared by the plurality of slave devices 104. The master device 102 may drive a particular CS line in order to enable a corresponding slave device 104 to send and receive data via the SI and SO lines, regulated by the SCK signal.

In the illustrated embodiment, the slave device 104 of the memory system 100 includes an SPI NAND controller 106, a cache memory 118, and a NAND memory array 108. The control lines CS and SCK and data line SI carry signals from the master device 102 to the SPI NAND controller 106. The SPI NAND controller 106 is configured to receive and transmit data via the SPI bus 126. For example, data transmitted by the master device 102 across the SPI bus 126 is received by the SPI NAND controller 106 inputs. Similarly, the SPI NAND controller 106 may also transmit data from the slave device to the master device via the SO data line. The SPI NAND controller 106 also transmits and receives data by way of the data input/output (DTIO) line and various access control lines, represented by reference numerals 114 and 116. The DTIO line allows for communication between the cache memory 118 and the SPI NAND controller 106 while the control line 116 enables the SPI NAND controller 106 to send and receive signals to and from the cache memory 118. Similarly, the control line 118 enables the SPI NAND controller 106 to send and receive signals to and from the NAND memory array 108. Although not illustrated in FIG. 1, the NAND memory device 104 may also include error correction circuitry (ECC).

During operation of the memory system 100, the SPI NAND controller 106 receives data transmitted via the SPI bus 126 and synchronizes the flow of data (DTIO) and control signals between other components of the NAND memory slave device 104. For example, the SPI NAND controller 106 receives data and commands from the master device 102 in a serialized format via the SI line and parses the incoming serialized signal for the data and the commands. As will be appreciated by those of ordinary skill in the art, the SPI NAND controller 106 may include shift registers that provide appropriate timing of the signals transmitted and received by the SPI NAND controller 106. Further, the SPI NAND controller 106 may include algorithms that are run onboard to interpret incoming signals that include commands, addresses, data, and the like. The algorithms may also include routines to determine the appropriate outputs of the SPI NAND controller 106, including, for example, address schemes, error corrections, and movements of data within the NAND memory array 108.

The SPI NAND controller 106 transmits signals from the SI data line to the NAND memory array 108 through the cache memory 118. The cache memory 118 receives signals from the SPI NAND controller 106 via the data line DTIO and acts as a buffer for the data being transmitted by the SPI NAND controller 106. The cache memory 118 may be of various sizes. For example, the cache memory 20 may include 2048 bytes, 4096 bytes, 8192 bytes or a multiple thereof. The cache memory 118 may also include smaller sizes such, as 256 bytes or 512 bytes. The cache memory 118 may also include one or more data registers to provide a path for the transfer of data between the cache memory 118 and the NAND memory array 108. In alternate embodiments, the data registers may be included in the NAND memory array 108, rather than the cache 118.

After the data is buffered in the cache memory 118, it may be transmitted to the NAND memory array 108 via data line 112. Similarly, data may also be read from the NAND memory array 108 via data line 112, and transmitted to the master device 102. In one embodiment, the SPI NAND controller 106 may translate signals sent to the NAND memory 108 into standard NAND format signals, such as command latch enable (CLE), address latch enable (ALE), write enable (WE), and read enable (RE) signals. In one embodiment, the SPI NAND controller 106 translates signals sent to the NAND memory 108 into a modified NAND format, rather than the standard NAND format. In one or more embodiments, the modified NAND format signals may include a set of hexadecimal command codes.

The NAND memory array 108 includes a memory cell array divided into blocks, wherein each block includes a number of pages. By way of example, in a memory array having blocks of 128 kilobytes (KB), each block may include 64 pages of 2048 bytes per page. Other configurations may include 32 pages of 4096 bytes per page, or 16 pages of 8192 bytes per page. Additionally, a number of additional bytes may be associated with each page for purposes of error correction (ECC). Typically, 8 to 64 bytes may be associated with each page for ECC. The NAND memory array 108 is programmed and read in page-based operations (e.g., one page at a time) and is erased in block based operations (e.g., one block at a time). Because the NAND memory array 108 is accessed sequentially as a page, random data access of bytes may not be possible. In other words, a single byte cannot be read from the NAND memory array 108 because read and write functions are performed one page at a time.

The NAND memory array 108 generally includes a boot block space including one or more boot blocks 110. The boot blocks 110 also include a number of pages, but are typically smaller than the main data blocks. For example, compared to the 128 KB data blocks described above, a boot block 110 may only be 16 KB in size. Boot blocks 110 are typically used to store sensitive data, such as boot code. In some embodiments, the NAND memory array 108 may include only a single boot block. However, as computing devices have advanced, the amount of data in the boot code has also increased in size and, accordingly, other embodiments may include a plurality of boot blocks 110. Additionally, it is also possible that updates to boot code are programmed into new boot blocks while the outdated code remains programmed, but is not executed by the memory system 100, instead of overwriting the outdated code.

In the illustrated embodiment, the NAND memory device 104 includes a boot block password register 120 for providing boot block security features. To provide secured access to the boot blocks 110, the master device 102 may be required to "enter" a user password by writing the password to the boot block password register 120 via data line 124 (through the SPI NAND controller 106). The entered password may be compared to the boot block password, which may be stored in a non-volatile block of the NAND memory array 118, in order to authenticate the master device for accessing the boot block space. Until the correct password is entered, read, write, and erase operations to the boot blocks 110 may be disabled. As will be appreciated by those skilled in the art, in one or more embodiments, the boot block password register 120 may be further adapted to protect the entire NAND memory array 108, so that until a correct password is entered, read, write, and erase operations are disabled as to both the boot block and the non-boot block space of the NAND memory array 108.

In the illustrated embodiment, the NAND memory device 104 also includes a boot block access register 122 for providing additional boot block security features. Various portions of the boot blocks may be write locked (locked to a read-only state) using the boot block access register 122. The boot block access register 122 may be configured to disable or enable boot block access by individual boot blocks, by individual pages within a particular boot block, or by a boot block region, which may include the entire boot block space, or a plurality of boot blocks defined by a user. These security features will be described in more detail in the subsequent paragraphs.

Figure 2:
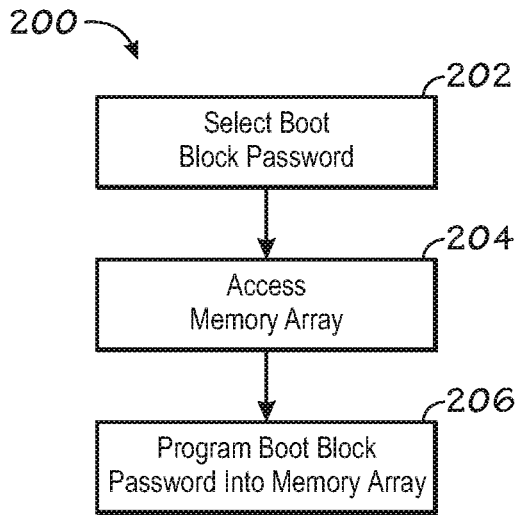
FIG. 2 is a flow chart illustrating a method for programming a boot block password into a memory device in accordance with one or more embodiments of the present invention.

Turning now to FIG. 2, a process 200 for programming a boot block password for providing secured access to one or more boot blocks 110 of NAND memory array 108 is illustrated in accordance with one or more embodiments of the present invention. At step 202, a boot block password is selected to be programmed into the NAND memory array 108. In one or more embodiments, the boot block password may be an n-bit password, for example, a 64-bit password. The boot block password may be programmed to a non-volatile area of the NAND memory array 108. For example, in certain embodiments, the boot block password is programmed to a specific block in the memory array 108. The specific block may be reserved for storing secured data, such as passwords and read, write, and erase protection status of each individual boot block, boot block page, or boot block region. The data in the specific block may be read through status registers when the NAND memory device 102 is initialized and/or powered on. In other embodiments, the boot block password may be programmed into one or more pages of the NAND memory array 108 designated as one-time programmable (OTP) areas. OTP areas are typically reserved for programming unique data to the memory device 108. While data, once written to an OTP area, may be stored permanently, some memory devices may allow for a limited number of program operations to an OTP page, for example, typically 1 to 4 operations per OTP page.

At step 204, after a suitable password is selected, the master device 102 accesses the non-volatile block in which the password is to be stored. In embodiments using a specific block, as described above, the boot block password may be programmed by issuing a write command from the master device 102 addressing the specific block via the SI line. In embodiments storing the password in the OTP area of the memory device 108, the master device 102 may need to first enable OTP access by setting an OTP access enable bit before the OTP area may be accessed for programming. At step 206, the boot block password is programmed into the memory array 108 for use as an authentication means, typically requiring the master device 102 to enter the correct password before accessing data stored in the boot blocks 110. In one or more embodiments, the memory device 104 is configured to enable boot block password protection at power up, thereby disabling read, write, and erase access until the correct password is supplied.

Figure 3:
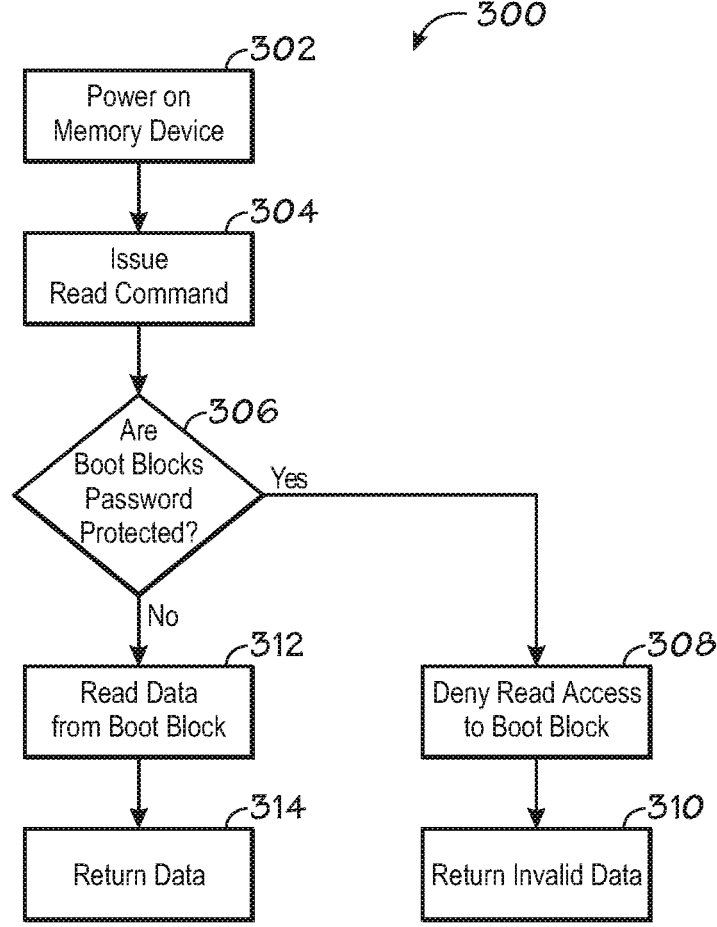
FIG. 3 is a flow chart illustrating a method for reading boot block data from a memory device in accordance with one or more embodiments of the present invention.

FIG. 3 illustrates a process 300 for issuing a read command to read data from a boot block 110. At step 302, the memory device 104 is powered on. At step 304, the master device 102 issues a read command via the SI data line to read data from a boot block 110. At step 306, if the boot blocks 110 are password protected, read access is denied (step 308) and, at step 310, invalid data (e.g., garbage data, all logical 1's) is returned via the SO data line. As described above, one or more embodiments of the memory device 104 may be configured to enable password protection at power up, denying read, write, and erase access to the boot blocks. However, if the boot blocks are not password protected at step 306, the master device may proceed to read data from the boot blocks, as indicated at step 312. The boot block data is returned to the master device 102 via the SO data line.

Figure 4:
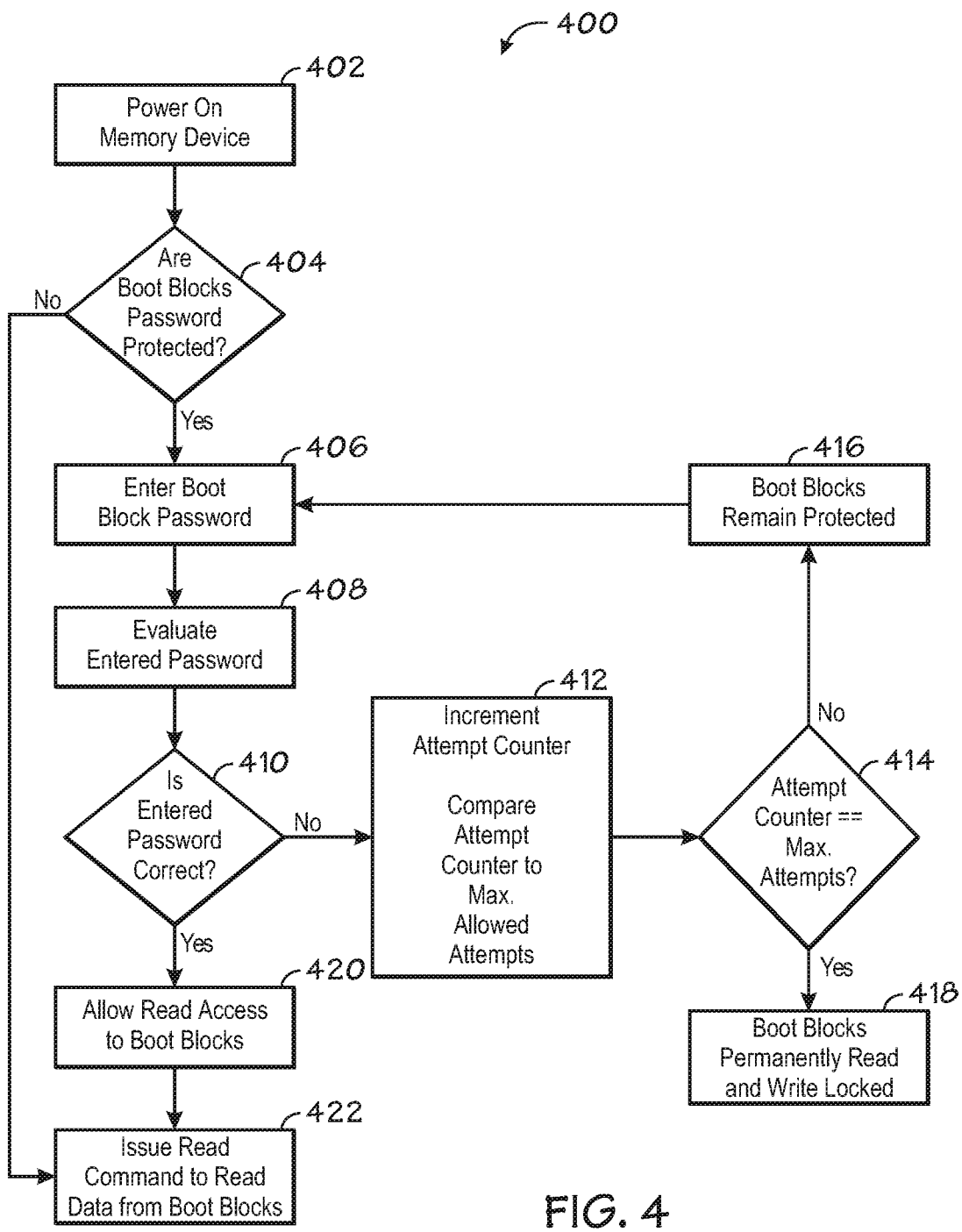
FIG. 4 is a flow chart illustrating a method for providing a boot block password to a memory device to securely access data in one or more boot blocks in accordance with one or more embodiments of the present invention.

Referring now to FIG. 4, a process 400 for providing a password to the memory device 104 in order to securely access and read data from the boot block space 110 is illustrated. At step 402, the memory device 104 is powered on. At step 404, if the boot blocks 110 are not password protected, the master device 102 may issue read commands via the SI data line to read data from the boot blocks (step 422). If however, at step 404, password protection is enabled, the master device 102 must provide the correct password in order to read data from the boot blocks 110. For example, in one or more embodiments, the boot blocks 110 are read, write, and erase protected via the boot block password at power up.

At step 406, the master device 102 provides a boot block password. In one or more embodiments, providing the password may include writing the password to the boot block password register 120 shown in FIG. 1. The value written to the password register 120 is evaluated, at step 408, with the programmed boot block password (process of FIG. 2). At step 410, if the entered password is incorrect, an attempt counter is incremented at step 412. The attempt counter tracks the number of unsuccessful attempts in which the master device 102 tries to access the boot blocks 110. In one or more embodiments, the attempt counter may be implemented by a shift register. Also in step 412, the value of the attempt counter is compared to a pre-determined maximum number of allowed attempts. If the number of unsuccessful attempts indicated by the attempt counter is equivalent to the maximum allowed attempts (step 414), as an additional security feature, the boot blocks 110 are permanently read, write, and erase locked, making any further attempts to access the boot block impossible. If, however, at step 414, the attempt counter has not reached the maximum allowed attempts, the boot blocks 110 remain protected (step 416), but the master device 102 may subsequently make additional attempts to enter a correct boot block password, returning the process 400 to step 406. At this point, however, any read commands issued to the boot blocks 110 via the master device 102 will fail and result in invalid data being returned on the SO data line, as discussed in FIG. 3.

Returning to step 410, if the password supplied by the master device 102 is determined to be correct, password protection for read, write, and erase operations for the boot blocks 110 is disabled, and the master device may issue read operations to the boot blocks (step 420). For example, at step 422, the master device 102 may issue read commands to read data from the boot blocks 110. In one or more embodiments, the password protection may be re-enabled the next time the memory device 104 is power cycled on, or re-enabled by the master device 102 after completion of necessary boot block operations. It should be noted that while entering the correct boot block password in step 410 disables the password protection for read, write, and erase operations, the boot blocks may be further protected from write and erase access by write lock bits in the memory array 108 corresponding to each boot block 110, each boot block page, or to one or more boot block regions.

Figure 5:
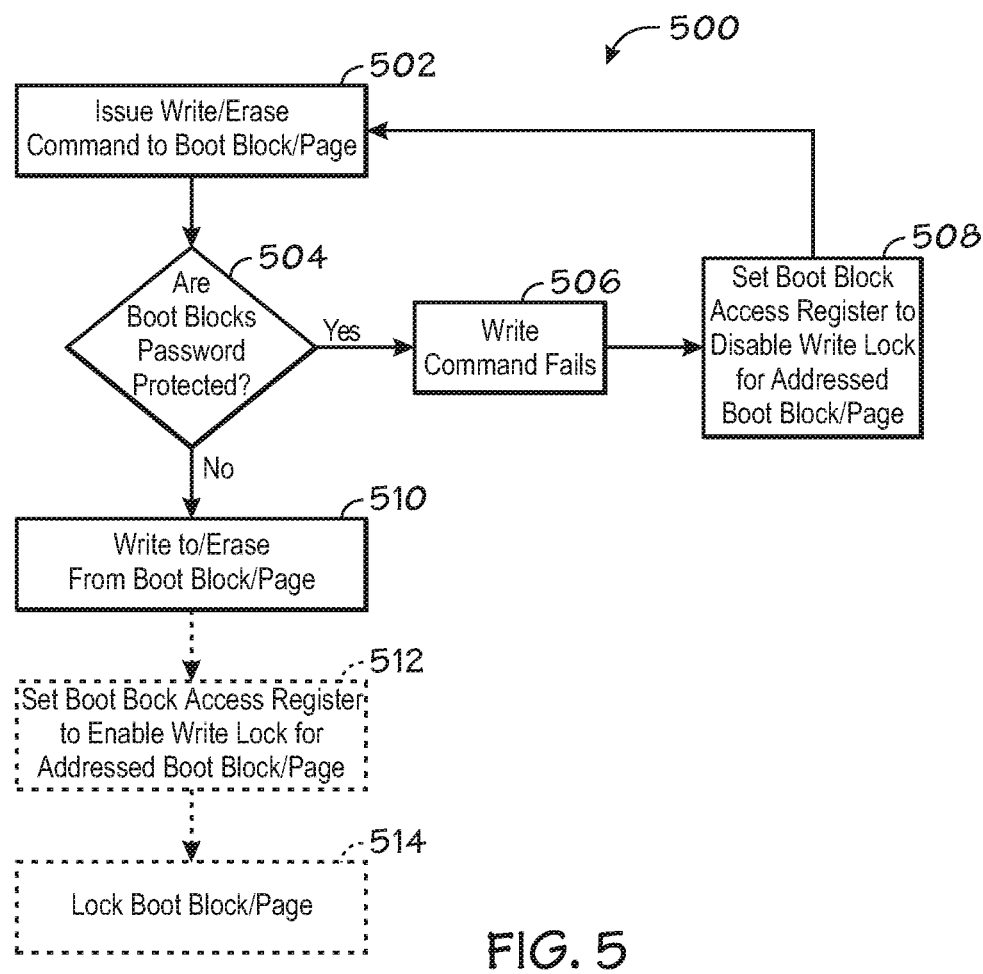
FIG. 5 is a flow chart illustrating a method for writing data to a boot block protected by a write lock bit in accordance with one or more embodiments of the present invention.

Referring now to FIG. 5 a process 500 for enabling access to a boot block or boot block page protected by a write lock bit is illustrated, in accordance with one or more embodiments of the present invention. While the process 500 will be described primarily with respect to unlocking and locking a boot block 110, the process 500 may similarly be applied to unlocking and locking individual boot block pages.

The process 500 assumes that a correct boot block password has been previously entered. If the correct password has not been entered, the master device 102 must first enter the correct boot block password, as described by the process 400 of FIG. 4, before proceeding. At step 502, the master device 102 issues a write or erase command to a boot block 110 via the SI data line. In one or more embodiments, a non-volatile write lock bit is associated with each boot block 110 for write/erase protection. In other embodiments, additional write lock bits may also be associated with each individual boot block page in order to lock or unlock an individual page. In one or more embodiments, when a write lock bit is enabled (e.g., set high to logical 1), the boot block 110 associated with that particular write lock bit is locked, denying write/erase access to the boot block 110 by the master device 102. The write lock bits function as an additional measure of security, protecting the boot blocks 110 even after a correct boot block password has been entered.

At step 504, if the write lock bit associated with the addressed boot block in the write/erase command of step 502 is enabled, the write/erase command fails, and no data is written to or erased from the addressed boot block 110 (step 506). It should be noted, that while the boot block 110 is write locked, the master device 102 may still read data from the boot block 110, provided the correct boot block password has been entered. In order to write to the addressed boot block, the master device 102 must set the boot block access register 122 to disable the write lock bit. In one or more embodiments, the master device 102 writes a disable value (e.g., logical 0) to the boot block access register 122 (step 508). A subsequent write/erase command will store the value in the boot block access register 122 into the corresponding write lock bit of the boot block 110 addressed in the write/erase command. Thus, if the boot block access register 122 stores an enable value when the write/erase command is executed, the addressed boot block will remain locked or, if the boot block access register 122 stores a disable value when the write/erase command is executed, the addressed boot block 110 is unlocked for write/erase operations. In one or more embodiments, the boot block access register 122 may include a plurality of registers, each of the plurality of registers configured to enable or disable write lock bits corresponding to a boot block, a boot block page, and a boot block region.

Returning to step 504, if the write lock bit associated with the addressed boot block 110 is disabled, the master device 102 may perform write and erase operations on the boot block 110 via the SI line (step 510). Following a write or erase operation in step 510, it may be desirable to lock the boot block 110 for protection from unwanted write/erase operations. In one or more embodiments, the master device 102 writes an enable value (e.g., logical 1) to the boot block access register 122 (step 512). A subsequent program execution command will store the enable value in the boot block access register 122 into the corresponding write lock bit of the addressed boot block 110, thereby locking the boot block 110 (step 514). As discussed above, one or more embodiments of the present invention may include write lock bits associated with each individual boot block as well as each boot block page, wherein the process 500 of FIG. 5 may similarly be applied for locking and unlocking boot block pages. By providing this increased resolution of boot block locking, a user has the flexibility of locking, for example, each boot code update. The boot block page lock operation is especially useful if boot code is updated often in small sizes.

In one or more embodiments of the present invention, the memory device 104 may also include a boot region lock feature, wherein a boot region may be defined by a user. For example, the boot region may encompass the entire boot block space. The boot block space may also be divided into two or more boot regions, each boot region encompassing an equal number of boot blocks 110. This provides a faster mechanism for locking a defined range of boot blocks as opposed to locking each individual boot block one by one.

Figures 6A, 6B:
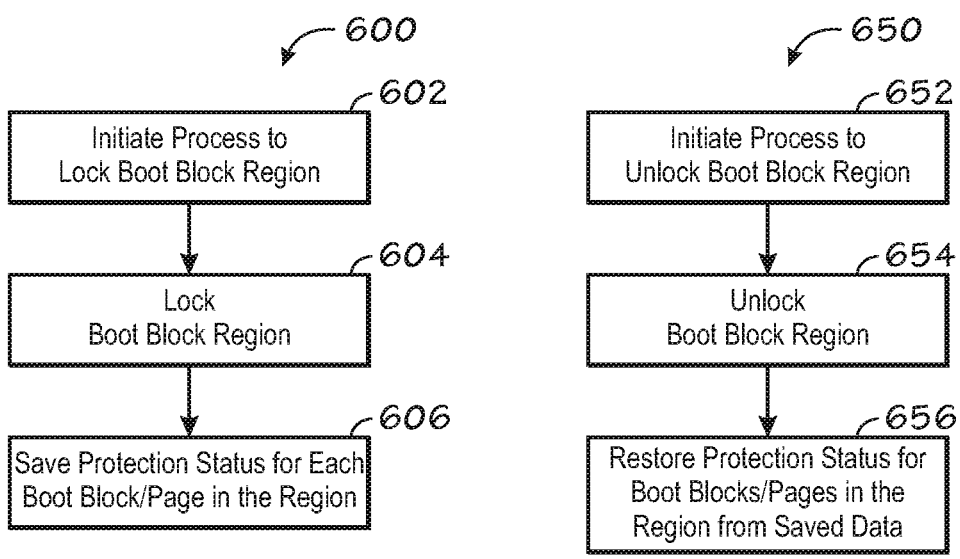
FIG. 6A is a flow chart illustrating a method for locking a boot region in accordance with one or more embodiments of the present invention.
FIG. 6B is a flow chart illustrating a method for unlocking a boot region in accordance with one or more embodiments of the present invention.

Referring now to FIG. 6A, a process 600 for locking and unlocking a boot region is illustrated, in accordance with one or more embodiments of the present invention. The process 600 is initiated at step 602. Like the boot block and boot block page locking and unlocking process 500 described in FIG. 5, each defined boot region may have a write lock bit associated with the boot region. In one or more embodiments, the master device 102 may write an enable value to the boot block access register 122 via the SI data line and data line 124. An execution command stores the enable value stored in the boot block access register 122 into the corresponding write lock bit of the addressed boot region, thereby locking the boot region (step 604). As such, each boot block and each boot block page within the locked boot region is protected from write and erase operations. At step 606, after the boot region is locked, the protection status (read/write/erase) for each boot block and boot block page in the boot region is stored in a separate non-volatile block.

This may include storing, for example, the values of each write lock bit associated with each boot block and boot block page within the boot region. By saving this data, the protection status of each block and page can be restored when the device is powered up, or when the boot region is unlocked at a later time.

The boot region may be subsequently unlocked via the process 650 illustrated in FIG. 6B. At step 652, the boot region unlock process is initiated, and may include, in one or more embodiments, writing a disable value to the boot block access register 122 via the SI data line and data line 124. An execution command stores the disable value in the boot block access register 122 into the corresponding write lock bit of the addressed boot region, thereby unlocking the boot region (step 654). At step 656, after the boot region is unlocked, the saved protection status (from step 606 of FIG. 6A) for each boot block and boot block page of the boot region is read from the non-volatile separate block. Write and erase operations may now be performed on the boot blocks 110 and the boot block pages within the boot region based on the restored protection status data.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A memory device comprising:
   a memory array;
   a serial interface controller comprising an input, wherein the serial interface is configured to interface with a master device via the input to receive a request to access a portion of the memory array from the master device and a password from the master device; and
   a register separate from and directly coupled to the serial interface controller via a data line, wherein the register is configured to enable or disable write or erase access to the portion of the memory array based upon data received indicating whether to enable or disable access to the portion that is written into the register via the input and the data line if the password is validated via comparison of the password written into a second register via the input and the data line with a stored value of the password, wherein the portion of the memory array is configured to store an indication of the data written into the register, wherein the serial interface controller is configured to initiate a read access of the portion of the memory array subsequent to receipt of a read command if the password is validated via comparison of the password written into a second register with the stored value of the password.

2. The memory device of claim 1, wherein the data indicating whether to enable or disable access to the portion is configured to be written into the register via the serial interface controller with a command accompanied by an address identifying the portion, wherein the command, the address, and the data are serially received by the serial interface controller.

3. The memory device of claim 1, wherein the register is configured to enable or disable write or erase access to the portion comprises the register being configured to lock or unlock write access to the portion.

4. The memory device of claim 1, wherein the register is configured to enable or disable write or erase access to the portion comprises the register being configured to lock or unlock erase access to the portion.

5. The memory device of claim 1, wherein the portion comprises an individual area of the memory array.

6. The memory device of claim 5, wherein the individual area of the memory array comprises a boot area.

7. The memory device of claim 1, wherein the portion comprises an individual page within a particular block of the memory array.

8. The memory device of claim 1, wherein the portion comprises a block region comprising one or more blocks of the memory array.

9. The memory device of claim 8, wherein the block region is user-definable.

10. The memory device of claim 8, wherein the block region comprises an entire boot area.

11. The memory device of claim 1, wherein the portion comprises a block region comprises a plurality of blocks.

12. The memory device of claim 1, wherein the register comprises a plurality of bits and wherein the portion is associated with a particular bit of the plurality of bits.

13. The memory device of claim 1, wherein the serial interface controller comprises a serial data in (SI) input as the input, a serial data out (SO) output, a serial clock (SCK) input, and a chip select (CS) input.

14. The memory device of claim 1, comprising a cache memory coupled to the controller by way of a first line, wherein the controller is coupled to the memory array by way of a second line and the cache memory is coupled to the memory array by way of a third line.

15. The memory device of claim 1, wherein the controller is configured to translate signals sent to the memory array into command latch enable (CLE), address latch enable (ALE) signal, write enable (WE), and read enable (RE) signals.

16. The memory device of claim 1, wherein the memory device is configured to track a number of unsuccessful attempts in which the master device attempts to access the portion of the memory array and prevents further accesses to the portion of the memory array when the number of unsuccessful attempts reaches a threshold value.

17. The memory device of claim 1, wherein the memory device is configured to authenticate the master device for accessing the memory array responsive to comparing the password entered by the master device to a stored password to validate the password.

18. The memory device of claim 17, wherein the stored password is stored in the memory array.

19. The memory device of claim 1, wherein the register comprises a boot access register.

20. A system comprising:
   a master device configured to transmit a password; and
   a memory device coupled to the master device, the memory device comprising:
   a memory array;
   a serial interface controller comprising an input, wherein the serial interface is configured to interface with the master device via the input to receive a request to access a portion of the memory array from the master device and a password from the master device; and
   a register separate from and directly coupled to the serial interface controller via a data line and configured to enable or disable write or erase access to the portion of the memory array responsive to a command addressing the portion and data indicating whether to enable or disable access to the portion, wherein the data is written into the register via the input and the data line if the password is validated at the memory device via comparison of the password written into a second register via the input and the data line with a stored value of the password, wherein the portion of the memory array is configured to store an indication of the data written into the register, wherein the serial interface controller is configured to initiate a read access of the portion of the memory array subsequent to receipt of a read command if the password is validated via comparison of the password written into a second register with the stored value of the password.

21. The system of claim 20, wherein the master device comprises programmed control circuitry.

22. The system of claim 21, wherein the programmed control circuitry comprises a microcontroller.

23. A method, comprising:
receiving a password from a host device at an input of a serial interface controller;
evaluating the password to determine whether the password is validated via comparison of the password written into a register via the input and a data line directly coupling the serial interface controller to the register with a stored value of the password;
receiving a request to access a portion of a memory array from the host device at the input of the serial interface controller;
writing a first value to a memory access register via the data line directly coupling the serial interface controller to the memory access register to disable an access lock value of the memory access register based upon the received request from the host device being a write or erase access if the password is validated, wherein the access lock value, when enabled, prevents write or erase access to the portion of the memory array;
writing a second value to a memory array to disable a write lock value of the memory array if the access lock value is disabled;
accessing a portion of the memory array if the write lock value is disabled; and
reading a value from the portion of the memory array based upon the received request from the host device being a read access if the password is validated.

* * * * *